United States Patent Office 3,252,940
Patented May 24, 1966

3,252,940
PRODUCTION OF TRIOXANE POLYMERS WITH CATIONIC EXCHANGE MATERIAL AS CATALYST
Russell M. Mantell, Princeton, N.J., assignor to Ethyl Corporation, New York, N.Y., a corporation of Virginia
No Drawing. Filed Mar. 20, 1962, Ser. No. 181,198
8 Claims. (Cl. 260—73)

This invention relates to polymeric materials and more particularly to a method for producing a tough, high molecular weight material by the polymerization or interpolymerization of trioxane.

Trioxane is a cyclic trimer of formaldehyde having a six-membered heterocyclic ring consisting of alternating oxygen atoms and methylene groups. Pure trioxane melts at 64° C. and boils without decomposition at approximately 115° C.

It is known that trioxane may be polymerized in the presence of certain specific inorganic fluorides, such as antimony trifluoride, to produce a tough high molecular weight polymer, known as polyoxymethylene, after a polymerization period ranging from one to seven days. The polymer is useful in the production of molded or extruded objects. It has been reported that the nature of the inorganic fluoride is quite critical and that many metallic fluorides, such as sodium fluoride, calcium fluoride, lead fluoride and ferric fluoride show no catalytic activity.

It is also known that trioxane may be polymerized more rapidly by the use of certain coordinate complexes of boron fluoride, especially the coordinate complex of boron fluoride with diethyl ether. However, this polymerization procedure suffers from the disadvantages that boron fluoride is a relatively expensive material. Furthermore, on completion of the polymerization, it is necessary to subject the polyformaldehyde polymer to various washing techniques. It has been reported that even after washing, the polymer contains traces of boron.

An object of this invention is to provide a new process for making a tough, high melting, high molecular weight material by the polymerization or interpolymerization of trioxane in which the polymerization reaction itself is relatively rapid but free from the shortcomings referred to above. Other objects will appear hereafter.

The above and other objects of this invention are accomplished by providing a process which comprises polymerizing trioxane under substantially anhydrous conditions in contact with a particulate heterogeneous catalyst system. These heterogeneous catalysts generally possess acidic properties. They generally fall into two general categories, although members of each category may be used in admixture, if desired.

The first category of heterogeneous particulate systems utilized in accordance with this invention is composed of the oxygen-containing inorganic compounds of at least one metal of Groups II–A, III–A, III–B, and IV–B of the Periodic System, the anionic portion of said compounds containing at least one member of the group consisting of oxides, silicon oxides, and carbonates. By and large, these materials are naturally occurring minerals or mineral components, such as acid clays, aluminas, silica aluminas, alumina borias, alumina magnesias, silica magnesias, silica zirconias, and the like. Preferred general catalysts of this type comprise at least one oxide of at least one metal taken from the foregoing groups of the Periodic Table since these oxide containing materials are generally more abundant, cheaper and more active as catalysts than the materials containing exclusively the silicon oxide or carbonate anionic moieties.

The Periodic System referred to above is as set forth in the "Periodic Chart of the Elements" appearing in Lange's Handbook of Chemistry, 6th ed., 1946, pages 58–59. Thus, the metals of Group II–A are beryllium, magnesium, calcium, strontium, barium, and radium. The Group III–A metals are aluminum, gallium, indium, and thallium. Making up Group III–B are scandium, yttrium, lanthanum (including the so-called "rare earth elements" or "lanthanum series" involving the elements of atomic number 58–71) and actinium. The elements of Group IV–B are titanium, zirconium, hafnium, and thorium.

A particularly preferred group of these oxygen-containing inorganic compounds as above defined comprises the various aluminas and alumina-containing minerals. Typical of these particularly preferred materials are alumina, corundum, diaspore, bauxite, gibbsite, silica alumina, montmorillonite, alumina boria, alumina magnesia, and the like.

The above-referred-to first category of heterogeneous catalysts used pursuant to this invention is sometimes referred to hereinafter, for the sake of convenience, as the inorganic heterogeneous catalysts.

The second category of particulate heterogeneous catalysts used in this invention is the cationic exchange materials containing one or more functional groups selected from the class consisting of phenolic, sulfonic, carboxylic, phosphonic, and phosphonous acid groups. As the art appreciates, these materials exhibit acidic properties—e.g. they provide titration curves which are quite similar to the titration curves of soluble acids containing corresponding polar groups. These materials are often categorized in the art as cationic exchange resins. Typical of these materials are the sulfonic acid cationic exchangers which are prepared from coal, lignite, peat, and other waste carbonaceous materials by sulfonating the same with $SO_3$, $H_2SO_4$ or chlorosulfonic acids. More active exchangers have been prepared by sulfonating synthetic organic materials such as copolymers prepared from styrene and divinyl benzene. Other sulfonic cationic exchangers are prepared by reaction among an aldehyde, a phenol, and a sulfonic acid or a sulfite.

The carboxylic type cationic exchangers involve such materials as coal oxidized with nitric acid; reaction products of phenol, acrolein and the semi-amide of oxamic acid; products produced by the interaction of caustic, 1,3,5-resorcylic acid, and formaldehyde; and the like. Generally similar procedures are utilized in the formation of the phosphonous and phosphonic cationic exchange materials.

Of these cationic exchange materials, those produced by the interaction of phenolic systems with formaldehyde and sulfonic acids are generally most effective for use in accordance with this invention. Accordingly, these particular materials are preferred. A wide variety of such materials is available commercially.

The foregoing cationic exchange materials as a whole are hereinafter sometimes referred to for convenience as cationic exchangers.

As pointed out above, all of the foregoing catalysts are utilized in particulate form. Although a wide range of particle size is satisfactory, it is generally preferable to utilize pelletized catalysts, e.g. particles of from about $\frac{1}{16}''$ to about $\frac{1}{2}''$ in diameter, because these materials are more readily separated from the polymer on completion of the polymerization reaction. Nevertheless, very effective use can be made of highly pulverulent materials involving particle sizes as small as about 500 mesh.

Preferably, the polymerization takes place in molten trioxane at atmospheric pressure. However, the temperature of the reaction may vary from about —90° up to about 200° C. and preferably from about −10° to about 180° C. and the trioxane may be in solid or vapor phase at the temperature extremes.

The trioxane in the reaction zone is preferably anhydrous or substantially anhydrous. Small amounts of moisture, such as may be present in commercial grade trioxane or may be introduced by contact with atmospheric air will not prevent polymerization, but should be removed for best yields.

A number of highly significant and important features characterize the process of this invention. For example, the practice of the process of this invention results in the relatively rapid polymerization of trioxane into tough, high molecular weight, high melting polymers. Moreover, the above catalysts are readily separated from the polymers so produced, effective use being made of such techniques as decantation, filtration, centrifugation, cyclone separations, or the like. Furthermore, the present catalysts have high activity and can be reused repeatedly, frequently without need of catalyst regeneration procedures. On top of this, a tremendous spectrum of catalysts meeting the above criteria are plentiful, inexpensive, and available as articles of commerce.

Another significant characteristic of this invention is the fact that tough, high molecular weight, high melting polymers are produced not only through the homopolymerization of trioxane, but by the interpolymerization thereof with a number of materials which provide interpolymers of superior performance characteristics.

Thus, one preferred embodiment of this invention involves the copolymerization of trioxane with a cyclic ether compound utilizing one or more of the catalysts described above. The cyclic ethers utilized in this embodiment are to possess at least two adjacent carbon atoms in a ring system. In general, these materials have the formula

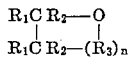

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and $n$ is an integer from zero to two. Minor amounts of these cyclic ethers are employed in association with the trioxane. Generally speaking, amounts of cyclic ethers ranging from about 0.1 to 15 mole percent give very satisfactory results. Preferred cyclic ethers include ethylene oxide, 1,3-dioxolane; although effective use may be made of such materials as 1,4-dioxane, trimethylene oxide, tetramethylene oxide, pentamethylene oxide, 1,2-propylene oxide, 1,2-butylene oxide, 1,3-butylene oxide and 2,2-di (chloromethyl) 1,3-propylene oxide.

A particularly preferred interpolymerization process of this invention involves the use of the foregoing catalysts to initiate and maintain the interpolymerization of trioxane with olefinic type comonomers. For this purpose, especially effective use can be made of such comonomers as alpha-monoolefinic hydrocarbons having the formula $H_2C=CHR$ wherein R is hydrogen or an alkyl group containing from 1 to about 30 carbon atoms; styrene monomers having the formula $H_2C=CHR'$ wherein R' is an aromatic or functionally substituted aromatic group having from about 6 to 16 carbon atoms; functionally substituted alpha-olefins having the formula $H_2C=X$ wherein X is a carbon atom substituted with from 1 to 2 halogen atoms, or a hydrocarbon (having from 1 to about 30 carbon atoms) which is substituted with a nitrile group, an ester function, one or more halogen atoms, an ether function, or the like; alpha- and/or beta-substituted styrene compounds in which the alpha and/or beta substituents are halogen atoms or alkyl groups containing up to about 4 carbon atoms. In all of these particularly preferred interpolymers, the olefinic monomer is chemically combined therewith in an amount ranging from about 0.1 mole percent to about 20 mole percent. The preferred ratio is from about 1 to about 15 mole percent, the range of from about 2 to about 5 mole percent being more especially preferred because of the excellent characteristics of these novel and eminently useful interpolymers. Further details as regards the nature of these novel high molecular weight, high melting interpolymers of trioxane with the above olefinic compounds and the desirable properties thereof are presented in co-pending applications Serial No. 181,201, filed March 20, 1962 in the name of Calvin N. Wolf; and Serial No. 181,200, filed March 20, 1962, in the name of Calvin N. Wolf.

Another especially preferred embodiment is the interpolymerization of trioxane with butyrolactone (and related lactones such as propiolactone, valerolactone, and caprolactone) using the above heterogeneous catalysts. Here again, the resulting interpolymers are characterized by having high molecular weights, high melting points, and in general desirable physical and chemical properties such as resistance to degradation and the like. Further details relative to these novel interpolymers and the advantageous properties thereof are found in co-pending application Serial No. 181,199, filed March 20, 1962 now abandoned in the name of Calvin N. Wolf. The ratios of trioxane/lactone compound are the same as in the case of the above-described trioxane/olefinic compound interpolymers.

The novel process of the present invention—including the various embodiments thereof—can be conducted utilizing a wide variety of polymerization techniques, e.g. bulk polymerization, solution polymerization, emulsion polymerization, vapor polymerization, and the like procedures.

Bulk polymerization is achieved by mixing trioxane and a heterogeneous catalyst as above defined (with or without the above referred to comonomer(s)). Thereafter, the reaction mixture is heated to a temperature between about 50° to about 90° C. for a period of time sufficient to effect polymerization. This reaction time generally varies from a matter of seconds or minutes up to one day, a period ranging up to about 12 hours usually being sufficient. The resultant polymer may then be ground up and molded (e.g. by compression molding at 180° C. for 2 minutes), or previous to molding, subjected to purification and/or stabilization procedures. Known stabilizer additives may be compounded with the polymers so produced and so treated.

Solution polymerization generally comprises contacting trioxane with the heterogeneous catalyst (with or without the above referred to comonomer(s)) in an inert solvent such as a liquid hydrocarbon at a temperature ranging from about −90° up to about 200° C. Generally, the pressure ranges from about atmospheric up to about 20 atmospheres. The reaction mixture is stirred for a time sufficient to obtain the desired polymer and thereupon the product is withdrawn from the reaction zone and dried. Again, subsequent treatments used in the art for improving upon the properties of polyformaldehyde polymers may be used, if desired.

The inert solvents which may be employed in the solution polymerization process are any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz., alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene, and gasoline, halogenated hydrocarbon compounds such as carbon tetrachloride, ethylene dibromide, methylene chloride, glycol ethers such as the dimethyl ether of diethylene glycol, the diethyl ether of diethylene glycol, monoethers such as diethyl ether, dibutyl ether, dicyclohexyl ether, dibenzyl ether, diphenyl ether, methyl phenyl ether; and the like.

In practicing the bulk or solution polymerization techniques, it is usually desirable to agitate the reaction mixture so as to keep the heterogeneous catalyst suspended in the reaction mixture. However, if desired, the catalyst may be utilized as a fixed or fluidized bed so long as the reaction mixture is in relatively intimate contact therewith.

Vapor polymerization comprises contacting in a reaction zone the vapors of trioxane (with or without the vapors of the above referred to comonomer(s)), in the presence of a heterogeneous catalyst of this invention. The temperatures range from about −20 up to about 200° C. depending somewhat upon the nature of the reaction system. The pressure at which the vapor polymerization process can be conducted generally ranges from about atmospheric up to about 200 atmospheres. The polymer may then be withdrawn from the reaction chamber as it is formed. Thereupon optional workup and/or stabilization procedures may be utilized.

The vapor polymerization procedure is readily adaptable to the use of fluidized bed techniques.

The processes as outlined above are capable of being adapted to a continuous process, a batch process or semi-batch operation; for example, where vapor polymerization reaction is being conducted it may readily be converted to a continuous process by merely adding the reactants and catalysts to the reaction zone while recovering the interpolymer as soon as it is formed. An excellent example of a batchwise process is the bulk polymerization of a formaldehyde such as trioxane with an olefin after which the desired polymer may then be recovered.

Generally, it is preferred to employ an essentially anhydrous inert atmosphere over the reaction mass particularly when bulk polymerization techniques are being employed. However, an inert atmosphere may be employed in other polymerization processes such as the solution polymerization and vapor polymerization. Typical of the inert gases which may be employed are carbon monoxide, nitrogen, argon, krypton, neon, helium, and the like. Certain saturated paraffinic hydrocarbons may also be employed as the inert atmosphere where the hydrocarbons are inerted to the reaction mass. Examples of paraffinic hydrocarbons which may be employed are methane, ethane, propane, and the like.

The amount of catalyst which may be employed in the process of this invention is susceptible of variation. Generally, amounts ranging from about 0.001 to about 5 percent by weight of the total reaction mass may be employed. However, the preferred amount of catalyst ranges from about 0.01 percent to about 2 percent by weight since within this range polymers having optimum properties such as strength, toughness and resilience are obtained. The amount of catalyst employed in the present invention, although not critical, forms an important element of the process. Thus, it is desirable to keep the catalyst concentration within the preferred range outlined above.

The polymers produced by the process of this invention have high molecular weights and high melting points. The molecular weights generally range from about 5000 to about 200,000. For most purposes, polymers having molecular weights ranging from about 10,000 to about 150,000 are preferred since these are well suited for use in molding, drawing fibers and the like. The molecular weight ranges are a direct function of the inherent viscosity. Thus, the polymers produced by the process of this invention generally have inherent viscosities ranging from about 0.3 to about 5.0, preferably from about 0.5 to about 3.0. The inherent viscosity is preferably measured at 0.5 percent by weight in p-chlorophenol containing 2 percent alpha-pinene at 60° C.

The melting points (polymer melt temperatures) of the polymers produced via this invention generally range from about 140° C. up to about 190° C. and preferably from about 150° C. up to about 185° C.

The practice of this invention will be further understood from the following examples. All parts and percentages are by weight.

Example I

Alumina was ground to 100–200 mesh powder and dried at 70° C. at a pressure of less than 1.0 mm. of mercury pressure for 24 hours. 0.5 part of alumina was added to 50 parts of molten trioxane under a nitrogen atmosphere and the mixture heated to a temperature of 85° C. for 24 hours. At the end of the reaction period, the polymer was ground up and extracted with boiling methanol after which it was filtered and dried to a constant weight. The formaldehyde polymer was obtained in a 40 percent yield and had an inherent viscosity of 0.8. The polymer melt temperature was 168° C. and the crystalline melting point was 152° C. When trioxane was subjected to the above conditions in the absence of the alumina catalyst, no polymerization was effected.

Similar results are achieved upon repeating the procedure of Example I with the exception that the following heterogeneous catalysts are substituted for the alumina: phenolic methylene sulfonic cation exchangers ("Amberlite IR-100," "Ionac C-200," "Wofatit P"), and inorganic heterogeneous catalysts, such as kaolin clay, ball clay, fire clay, bentonite, fuller's earth, activated clay, clayite, allanite, arizonite, and caledonite.

Example II

The procedure of Example I was repeated with the exception that silica alumina (75 percent silica, 25 percent alumina) which had been ground to 100–200 mesh was used in place of the alumina. The resultant polyoxymethylene polymer was obtained in a 30 percent yield. It had an inherent viscosity of 0.9 and a polymer melt temperature of 170° C. The crystalline melting point of the homopolymer was 154° C.

Upon replacing the catalyst of Example II with such catalysts as carboxylic cation exchangers ("Alkalex," "Duolite CS-100," "Wofatit C") and inorganic heterogeneous catalysts such as bodenite, cerite, penninite, dumortierite, elpidite, and florencite comparable results are achieved.

Example III

The procedure of Example I was repeated with the exception that silica alumina (87 percent silica, 13 percent alumina) which had been ground to 100–200 mesh was used in place of the alumina. The resultant polyoxymethylene polymer was obtained in a 36 percent yield. It had an inherent viscosity of 0.8 and a polymer melt temperature of 167° C. The crystalline melting point of the homopolymer was 154° C.

Similar results are achieved upon repeating the procedure of Example III with the exception that the following heterogeneous catalysts are substituted for the silica alumina: aluminum silicate cation exchangers ("Permutit," "Decalso," "Zeo Dur") and inorganic heterogeneous catalysts, such as gorceixite, halloysite, ilmenite, anauxite, dickite, and nacrite.

Example IV

The procedure of Example I was repeated with the exception that "Amberlite IR" (an acidic cationic exchanger which is understood to be a phenolic methylene sulfonic product produced by the reaction of phenol, formaldehyde and a sulfonic acid) which had been ground to 100–200 mesh was used in place of the alumina. The resultant polyoxymethylene polymer was obtained in a 44 perecent yield. It had an inherent viscosity of 0.7 and a polymer melt temperature of 173° C. The crystalline melting point of the homopolymer was 155° C.

Upon replacing the catalyst of Example IV with such catalysts as "Amberlite IR–120" and "Dowex 50" (typical nuclear sulfonic cation exchangers); and kaolinite, nacrite, lawsonite, manandonite, lepidomelane, and zinnwaldite (typical inorganic heterogeneous catalysts), comparable results are achieved.

*Example V*

The procedure of Example I was repeated with the exception that montmorillonite which had been ground to 100–200 mesh was used in place of the alumina. The resultant polyoxymethylene polymer was obtained in a 16 percent yield. It had an inherent viscosity of 0.5 and a polymer melt temperature of 172° C. The crystalline melting point of the homopolymer was 156° C.

Similar results are achieved upon repeating the procedure of Example V with the exception that the following heterogeneous catalysts are substituted for the montmorillonite: "Amberlite IR–105," "Duolite C–3," and "Wofatit KS" (typical phenolic methylene sulfonic cation exchangers); and mica, phlogopite, nontronite, orvillite, rutile, and sillimanite (typical inorganic heterogeneous catalysts).

*Example VI*

The procedure of Example I was repeated except that the alumina was used in pelletized form. Essentially identical results were achieved. For example, the resulttant homopolymer had an inherent viscosity of 0.8.

Upon replacing the catalyst of Example VI with such catalysts as "Zeo Karb" (sulfonated coal), "Amberlite IRC–50," and "Permutit 216" (carboxylic cation exchangers); and staurolite, zircon, zunyite, aluminite, alugenite, andalusite (typical inorganic heterogeneous catalysts), comparable results are achieved.

*Example VII*

The procedure of Example II was repeated except that the silica alumina was used in pelletized form. Essentially identical results were achieved. For example, the resultant homopolymer had an inherent viscosity of 0.8.

Similar results are achieved upon repeating the procedure of Example VII with the exception that the following heterogeneous catalysts are substituted for the silica alumina: phenolic methylene sulfonic cation exchangers ("Dowex 30," "Wofatit K," and "Zeo Rex"); and inorganic heterogeneous catalysts, such as axinite, auerbachite, bodenbenderite, brookite, clinochlore, and prochlorite.

*Example VIII*

The procerure of Example I may be repeated utilizing the following comonomer systems:

(a) Trioxane/hexene-1 (95:5 mole percent, respectively)
(b) Trioxane/styrene (96:4 mole percent, respectively)
(c) Trioxane/butene-1 (98:2 mole percent, respectively)
(d) Trioxane/ethylene oxide (90:10 mole percent, respectively)
(e) Trioxane/1,3-dioxolane (95:5 mole percent, respectively)
(f) Trioxane/butyrolactone (92:8 mole percent, respectively)
(g) Trioxane/acrylonitrile (96:4 mole percent, respectively)
(h) Trioxane/butylacrylate (92:8 mole percent, respectively)
(i) Trioxane/methyl methacrylate (88:12 mole percent, respectively)
(j) Trioxane/methacrolein (92:8 mole percent, respectively)
(k) Trioxane/vinyl acetate (94:6 mole percent, respectively)
(l) Trioxane/methyl vinyl ketone (97:3 mole percent, respectively)
(m) Trioxane/acrylic acid (94:6 mole percent, respectively)

When the above interpolymerizations are conducted utilizing the following inorganic heterogeneous catalysts, generally similar results are obtained: chloritoid, clinohedrite, columbite, epididymite, epistolite, halotrichite, margarite, biotite, lepidolite, muscovite, paragonite, alumina boria, alumina magnesia, and alumina zirconia. By the same token, the above interpolymerizations proceed in a generally similar fashion when cationic exchangers such as those described above are used as catalysts.

Other examples of inorganic heterogeneous catalysts which may be employed in practicing the various embodiments of this invention may be found in E. S. Dana, "Dana's System of Mineralogy," 6th Edition; C. Hintze, "Handbuch de Mineralogie," Volumes I and II; A. N. Winchell, "Elements of Optical Mineralogy," Part II, 3rd Edition; and W. E. Ford, "Dana's Textbook of Mineralogy," 4th Edition.

Other forms of heterogeneous catalysts which may be used in the process of this invention are the cationic exchangers such as disclosed in "Ion Exchange Technology," Academic Press, New York (1956); "Ion Exchange Resins," by Kunin and Myers, John Wiley and Sons (1950); and "Dowex Ion Exchanger," The Dow Chemical Company (1958).

Exemplary of the alpha-olefin monomers which may be employed in practicing the particularly preferred embodiments of this invention are Ethylene,
Propylene,
Butene-1,
Pentene-1,
Hexene-1,
Heptene-1,
Octene-1,
Nonene-1,
Decene-1,
Hendecene-1,
Dodecene-1,
Tridecene-1,
Tetradecene-1,
Pentadecene-1,
Hexadecene-1,
Heptadecene-1,
Octadecene-1,
Nonadecene-1,
Eicosene,
Dococene-1,
Tricocene-1,
Tetracocene-1,
Pentacocene-1,
Hexacocene-1,
Heptacocene-1,
Octacocene-1,
Nonacocene-1,
Tricotene,
Hentricocene,
Dotricotene,
3-methyl pentene-1,
4-methylpentene-1,
3-propyl pentene-1,
3-propyl-4-methyl pentene-1,
3-methylbutene-1,
3-propyl-4-methyl hexene-1,
3,4-dimethyl pentene-1,
3-methyl-5-methyl-hexene-1,
3-butyl-4-propylheptene-1,
3-methyloctene-1,
3,4,5-trimethyloctene-1,
5-propyl-7,8-dimethylnonene-1,
7-methylnonene-1,
8-methylnonene-1,
8,10,12-triethyl octadecene
4-butyl-3-propyl-8,9-trimethyl tricocene-1,
3-hexyl-4-propyl-10-butyl triacotene-1,
3-butyl-4,5-dimethyl octene-1, 3-methyl octadecene-1,
4-methyl octadecene-1,
5-methyl octadecene-1,
6-ethyl octadecene-1,
4,8,9-tributyl octadecene-1 and
4,5,10,15-tetraethyl hexacocene-1

Typical functionally substituted alpha-olefins which may be used in the particularly preferred embodiments of this invention are vinyl esters (e.g., acrylates, methacrylates, etc.), vinyl ethers, acroleins, acrylic acids, acrylonitrile (and the higher homologs thereof), vinyl halides, allyl halides, and the like. Typical of the specific compounds which can be so used are vinyl acetate, vinyl ether, vinyl chloride, vinyl bromide, vinylidene chloride, methyl acrolein, acrolein, butyl acrylate, methyl methacrylate, acrylonitrile, vinyl methyl ketone, allyl chloride, allyl bromide, and the like.

The styrene monomers (i.e. vinyl aromatic compounds) which may be employed in the particularly preferred embodiments of this invention include Amino styrene,
4-benzyl styrene,
2-bromo styrene,
3-bromo styrene,
4-bromo styrene,
2-bromo-4-trifluoromethyl styrene,
3-sec-butyl styrene,
3-tert-butyl styrene,
4-tert-butyl styrene,
3-carbomethoxy styrene,
3-carboxy styrene,
2-chloro styrene,
3-chloro styrene,
4-chloro styrene,
4-cyano styrene,
4-cyclohexyl styrene,
2,3-dichloro styrene,
2,4-dichloro styrene,
2,5-dichloro styrene,
2,6-dichloro styrene,
3,4-dichloro styrene,
3,5-dichloro styrene,
3,4-dimethoxy styrene,
2,4-dimethyl styrene,
2,5-dimethyl styrene,
3,4-dimethyl styrene,
3,5-dimethyl styrene,
4,N,N-dimethylamino styrene,
4-N,N-dimethylsulfonamido styrene,
4-ethyl styrene,
2-fluoro styrene,
3-fluoro styrene,
4-fluoro styrene,
3-fluoro-4-trifluoromethyl styrene,
2-methoxy styrene,
3-methoxy styrene,
4-methoxy styrene,
3-methyl styrene,
3-methyl-4-methoxy styrene,
3-methyl-6-methoxy styrene,
4-methyl styrene,
2-methyl-4-methoxy-5-isopropyl styrene and the like.

Typical of styrene monomers which contain alpha-substitution which may be employed in lieu of the styrene monomers named hereinbefore in conducting the particularly preferred facets of this invention are α-Chloro styrene,
α-Cyano styrene,
β-Cyano styrene,
4-α-Dichloro styrene,
3,4-dimethyl-α-bromo styrene,
α-Methyl styrene,
α-Methyl-4-bromo styrene,
α-Methyl-3-bromo-4-methyl styrene,
α-Methyl-3-chloro styrene,
α-Methyl-4-chloro styrene,
α-Methyl-3-chloro-4-methyl styrene,
α-Methyl-3,5-dibromo styrene,
α-Methyl-3,4-dichloro styrene,
α-Methyl-3,5-dichloro styrene,
α-Methyl-3,4-dimethyl styrene,
α-Methyl-4-ethoxy styrene,
α-Methyl-2-fluoro styrene,
α-Methyl-4-methoxy styrene,
α-Methyl methyl styrene,
α-Methyl-2-methyl-3-chloro styrene,
α-Methyl-4-isopropyl styrene
α-Methyl trifluoromethyl styrene,
α-Methyl-3-trifluoromethyl-4-fluoro styrene,
α-Methyl-3,4-methylenedioxy styrene,
α-Methyl pentachloro styrene,
α-Methyl-4-phenoxy styrene,
α-Methyl-3-phenyl styrene,
α-Methyl-4-phenyl styrene,
α-Methyl-4-isopropyl styrene,
α-Methyl-2-propyl-5-methoxy styrene,
α-Methyl tetrachloro styrene,
α-Methyl trichloro styrene,
α-Methyl-3-trifluoromethyl styrene,
α-Methyl-3-trifluoromethyl-4-bromo styrene,
α-Methyl-2-trifluoromethyl-4-fluoro styrene, and the like.

As pointed out above, thermal stabilizer additives may be compounded with the polymers produced via this invention. Typical of these stabilizer additives are hydrazines (U.S. 2,810,708); hydrazones (Belgian 597,962); phenols (U.S. 2,871,220); ureas and thioureas (U.S. 2,-893,972); sulfides and polysulfides (Belgian 599,409); amines (U.S. 2,920,059 and 2,936,298); oxalic diamides (Belgian 589,257); polysulfonic acids (Belgian 585,164); hydroxy anthroquinones (Belgian 585,165); and benzophenones (Australian 230,163). These stabilizers are generally compounded with the polymers after the polymerization reaction has been completed.

Similarly the polymers may be end capped by reacting the terminal hydroxyl groups of the various polymers with an anhydride such as acetic anhydride (U.S. 2,964,-500); or a dialkyl acetal (Belgian 570,884); to esterify the groups.

The polymers may also be subjected to a combination of the compounding of stabilizers and end capping. Thus one may end cap the crude polymer by reacting the polymer with an anhydride and thereafter compound stabilizers such as hydrazines, phenols, ureas, and the like, with the polymer product.

Another technique by which additional stabilization may be achieved is to rigorously remove catalyst residues from the novel polymers of this invention. Thereupon, if desired, a stabilizer additive or end capping procedure, or both, may be utilized.

The polymers produced via this invention are useful for the preparation of films (as disclosed in U.S. 2,952,-878), sheets, funicular structures such as fibers, filaments, bristles, rods, tubes and molding powders. Thus, the polymers may be employed in any general use for which known tough and thermally stable thermoplastic polymers have been put.

Typical methods of molding the interpolymers of this invention are those techniques set forth in "Polymer Processes," vol. X, "High Polymers," by Schildknecht, Interscience Publishers, New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

What is claimed is:

1. A process for preparing high molecular weight, high melting polymeric material which comprises polymerizing trioxane under substantially anhydrous conditions in contact with an acidic particulate heterogeneous catalyst consisting of a cationic exchange material containing a functional group selected from the group consisting of phenolic, sulfonic, carboxylic, phosphonous and phosphonic acid groups.

2. The process of claim 1 wherein said catalyst is an acidic cation exchange resin produced by reaction among phenol, formaldehyde and a sulfonic acid.

3. A process for preparing high molecular weight, high melting polymeric material which comprises copolymerizing trioxane and a comonomer as hereinafter defined under substantially anhydrous conditions in contact with an acidic particulate heterogeneous catalyst consisting of a cationic exchange material containing a functional group selected from the class consisting of phenolic, sulfonic, carboxylic, phosphonous, and phosphonic acid groups; said comonomer being selected from the group consisting of
(a) an alpha monoolefinic hydrocarbon having the formula $$H_2C=CHR$$

wherein R is selected from the group consisting of hydrogen and alkyl containing from 1 to 30 carbon atoms;
(b) a styrene monomer having the formula $$H_2C=CHR'$$

wherein R' is an aromatic group having from 6 to 16 carbon atoms;
(c) a functionally substituted alpha olefin having the formula $$H_2C=X$$

wherein X is selected from the group consisting of (i) a carbon atom substituted with at least one halogen atom, (ii) a hydrocarbon group having from 1 to 30 carbon atoms, which hydrocarbon group is substituted with at least one member selected from the group consisting of a nitrile group, an ester function, a halogen atom, and an ether function; and
(d) a styrene monomer in which at least one of the alpha and beta positions in the styrene monomer contains a substituent selected from the group consisting of a halogen atom and alkyl groups containing up to 4 carbon atoms; said styrene monomer containing from 8 to 16 carbon atoms.

4. The process of claim 3 wherein said comonomer is an alpha monoolefinic hydrocarbon having the formula $$H_2C=CHR$$

wherein R is selected from the group consisting of hydrogen, and an alkyl group containing from 1 to 30 carbon atoms.

5. The process of claim 3 wherein said comonomer is a styrene monomer having the formula $$H_2C=CHR'$$

wherein R' is an aromatic group having from 6 to 16 carbon atoms.

6. The process of claim 3 wherein said comonomer is a functionally substituted alpha olefin having the formula $$H_2C=X$$

wherein X is selected from the group consisting of (i) a carbon atom substituted with at least one halogen atom, (ii) a hydrocarbon group having from 1 to 30 carbon atoms, which hydrocarbon group is substituted with at least one member selected from the group consisting of a nitrile group, an ester function, a halogen atom, and an ether function.

7. The process of claim 3 wherein said comonomer is a styrene monomer in which at least one of the alpha and beta positions in the styrene monomer contains a substituent selected from the group consisting of a halogen atom and alkyl groups containing up to 4 carbon atoms; said styrene monomer containing from 8 to 16 carbon atoms.

8. The process of claim 3 wherein said comonomer is styrene.

References Cited by the Examiner
UNITED STATES PATENTS

| | | | |
|---|---|---|---|
| 2,304,431 | 12/1942 | Walker | 260—67 |
| 2,625,569 | 1/1953 | Gresham et al. | 260—67 |
| 3,005,799 | 10/1961 | Wagner | 260—67 |
| 3,030,338 | 4/1962 | Aries | 260—67 |
| 3,118,747 | 1/1964 | Godignola et al. | 55—33 |

OTHER REFERENCES

Kern et al., International Symposium on Macromolecular Chem., June 14–18, 1960, Moscow, U.S.S.R., Papers and Summaries, Section II, pp. 280–285.

Kern et al., Angewandte Chemie, 73, No. 6, pp. 177–224, March 21, 1961.

Dissertation Abstracts, 19, 1208 (1958), AS 30 M5 (Library of Congress Card No. Microfilm 58–5572).

Okamura et al., J. Chem. Soc., Japan, 65, No. 5, pp. 712–716 (1962).

WILLIAM H. SHORT, *Primary Examiner.*

JOSEPH R. LIBERMAN, *Examiner.*